I. F. Tice,
Steam Plow.
No. 111,404. Patented Jan. 31, 1871.

Witnesses.
A. DuBois
Geo. W. Rothwell

Inventor.
Isaac F. Tice
by A. P. Haight
Atty

UNITED STATES PATENT OFFICE.

ISAAC P. TICE, OF NEW YORK, N. Y.

IMPROVEMENT IN DIGGING-MACHINES.

Specification forming part of Letters Patent No. 111,404, dated January 31, 1871; antedated January 21, 1871.

*To whom it may concern:*

Be it known that I, ISAAC P. TICE, of the city, county, and State of New York, have invented a new and Improved Digging-Machine; and I do hereby declare that the following is a full, clear, and exact description of the same, reference being had to the accompanying drawing, and to the letters of reference marked thereon, making a part of this specification.

This invention relates to a new and improved machine for digging by steam, and is designed to supersede the plow for general use, it being applicable in all cases where ground has been previously broken up, or, if not, where the soil is naturally light and friable.

The invention consists in the employment or use of a series of spades or diggers, one or more, which are driven by steam, and arranged to work in a manner similar to the usual hand or manual operation, while the implement itself is drawn along bodily by draft-animals or a team.

The ordinary digging by hand is acknowledged by husbandmen to be the most perfect way of turning over and pulverizing the soil for agricultural purposes, the plow being used simply on account of the expedition with which it performs its work, economy in time compensating, in a fiscal point of view, for its imperfectness, which consists in the "sole" of the plow causing, under the downward pressure, the soil to be densely compacted under the upper and light portion thrown up, so as to leave a hard subsoil, which is extremely difficult for the roots of growing plants to penetrate, and favors the retention of moisture around them.

The object of the present invention is to retain the advantage of the manual digging operation, and at the same time perform the work more rapidly than it can be done by the ordinary plow.

Figure 1:
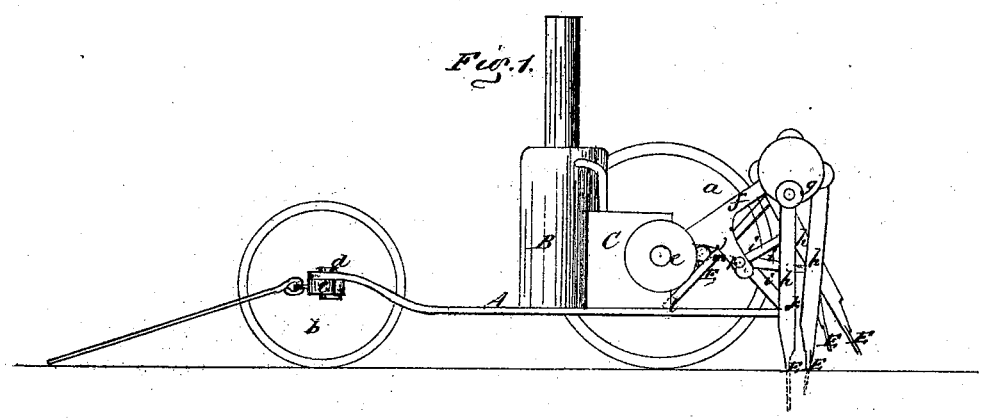
Figure 2:
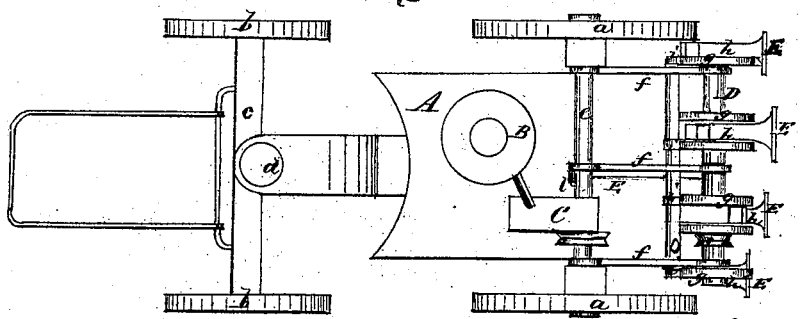

In the accompanying drawing, Figure 1 is a side view of my invention; Fig. 2, a plan or top view of the same.

Similar letters of reference indicate corresponding parts in the two figures.

A represents a carriage mounted on four wheels, $a\ a\ b\ b$, the latter, $b$, being at the front end, and attached to an axle, $c$, which turns on a king-bolt, $d$, as in ordinary four-wheel vehicles. This carriage is drawn along by animal-power, and upon it there is placed a boiler, B, in which steam is generated to drive an engine, C, of any desired power, the engine being also placed on the carriage.

On the rear axle, $e$, of the wheels $a\ a$ there are fitted loosely three (more or less) radial arms, $f$, in the outer ends of which a shaft, D, has its bearings, motion being given to said shaft from the engine by means of a belt or by gearing.

On the shaft D there are four cranks, $g$, to which the helves $h$ of spades or diggers E are attached or pivoted, and retained in position by arms $i$, connected to the helves $h$, and to pendants $j$ of the arms $f$ by pivots $k$. The helves $h$ are attached to the cranks $g$ at variable points, being a quarter of a revolution of the cranks apart, so that the spades will enter the ground consecutively, or one after the other, to cause a harmonious operation of the same, and avoid all unnecessary jars and concussions.

The spades or diggers may be made to work the desired depth into the ground or be retained above it by means of a lever, F, having its fulcrum at $l$ at the bottom of the carriage, and provided with a pin or friction-roller, $m$, which acts against one of the arms $f$, which support the shaft D.

It will be understood, of course, that the spades or diggers are operated by steam exclusively, while the machine is drawn along by a team; and it will be seen that the spades or diggers enter the ground about in a vertical direction, and gradually, as they rise, assume an inclined position backward from the rear of the machine, so as to cast the earth off from them in that direction, similar to the ordinary manual operation of digging. This action of the spades or diggers favors the draft or forward movement of the machine.

I would remark that in lieu of the arms $i$, a fixed plate having guide-openings in it for the helves $h$ to work through may be used to keep the spades or diggers in proper working position; but I prefer the arms *i*.

Having thus described my invention, what I claim as new, and desire to secure by Letters Patent, is—

1. The combination of the crank *g* with the arm I and helve A, shaft D, and shaft O, substantially as and for the purpose set forth.

2. The arrangement of the axle C, frame B B B, constructed as described, with the lever F, with friction-roller, substantially as described, and for the purpose set forth.

ISAAC P. TICE.

Witnesses:
JOHN A. WIEDERSHEIM,
JAMES L. NORRIS.